US006887822B2

(12) United States Patent
Hu

(10) Patent No.: US 6,887,822 B2
(45) Date of Patent: May 3, 2005

(54) METHOD FOR MAKING SILICA SUPPORTED, CRUSH-RESISTANT CATALYSTS

(75) Inventor: Yatao Hu, Wayne, PA (US)

(73) Assignee: PQ Corporation, Berwyn, PA (US)

( * ) Notice: Subject to any disclaimer, the term of this patent is extended or adjusted under 35 U.S.C. 154(b) by 71 days.

(21) Appl. No.: 09/964,177

(22) Filed: Sep. 25, 2001

(65) Prior Publication Data

US 2003/0069130 A1 Apr. 10, 2003

(51) Int. Cl.[7] .............................. B01J 21/08; B01J 21/14
(52) U.S. Cl. ........................ 502/232; 502/236; 502/237; 502/239
(58) Field of Search ................................ 502/232–263, 502/60–87

(56) References Cited

U.S. PATENT DOCUMENTS

| | | | |
|---|---|---|---|
| 2,496,265 A | | 2/1950 | Bilisoly |
| 3,159,569 A | | 12/1964 | Hansford |
| 3,247,248 A | * | 4/1966 | Sims et al. .................. 562/598 |
| 3,306,843 A | | 2/1967 | Beuther et al. |
| 3,324,047 A | | 6/1967 | Hansford |
| 3,346,509 A | | 10/1967 | Stewart |
| 3,838,040 A | | 9/1974 | Ward |
| 3,840,587 A | * | 10/1974 | Pearson ....................... 560/210 |
| 3,846,337 A | * | 11/1974 | Young ........................... 502/65 |
| 3,905,916 A | | 9/1975 | Riley et al. |
| 3,933,888 A | * | 1/1976 | Schlaefer ..................... 558/372 |
| 3,972,833 A | | 8/1976 | Michalko et al. |
| 4,100,058 A | * | 7/1978 | Hilfman ....................... 208/264 |
| 4,368,303 A | | 1/1983 | McDaniel |
| 4,422,959 A | | 12/1983 | Lawson et al. |
| 4,990,662 A | * | 2/1991 | Hagen et al. ................. 562/599 |
| 5,063,038 A | * | 11/1991 | Kirker et al. ................ 423/703 |
| 5,069,816 A | | 12/1991 | DeSantis et al. |
| 5,369,071 A | * | 11/1994 | Degnan et al. ................ 502/71 |
| 5,426,082 A | * | 6/1995 | Marsden ...................... 502/235 |
| 5,625,013 A | | 4/1997 | Mueller et al. |
| 6,248,911 B1 | | 6/2001 | Canessa et al. |
| 6,355,596 B2 | * | 3/2002 | Hu et al. ..................... 502/350 |

FOREIGN PATENT DOCUMENTS

| | | |
|---|---|---|
| CA | 1064008 | 10/1979 |
| EP | 0 992 285 | 4/2000 |
| GB | 988703 | 4/1965 |
| WO | WO 86/00299 | 1/1986 |
| WO | WO 99/52628 | 10/1999 |

OTHER PUBLICATIONS

Sultanov et al., "Preparation of a strengthened aluminosilicate catalyst from industrial spherodial silica gel," USSR Katal. Pererab. Uglevodorod. Syria (1971), No. 5 91–104. From Ref.Zh., Khim. 1972, Abstr. No. 24L142. Journal written in Russian. CAN 78:164644 AN1973:164644 CAPLUS [Copyright 2001 ACS].
International Search Report dated Dec. 17, 2002, from International Application No. PCT/US02/30331.

* cited by examiner

Primary Examiner—Steven Bos
Assistant Examiner—William G. Wright, Sr.
(74) Attorney, Agent, or Firm—RatnerPrestia

(57) ABSTRACT

A method for making a silica supported catalyst involves impregnating a silica component with a catalytic metal using an aqueous, alkaline bath before drying. More specifically, the method involves forming and washing a silica component, such as a silica gel or a co-gel, for example a silica-zirconia co-gel. Then, the washed silica component is contacted with the alkaline bath to effect the impregnation with the catalytic metal, such as cesium, to form an activated silica component. Subsequently, the activated silica component is dried to form the catalyst. The resulting catalysts demonstrate good mechanical strength.

18 Claims, 1 Drawing Sheet

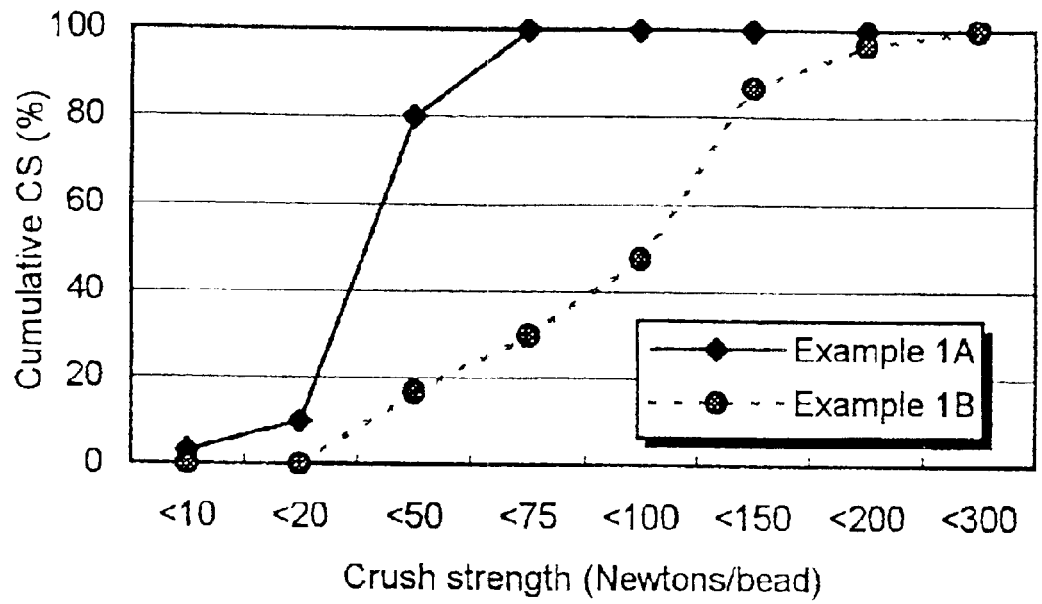
Figure 1 Cumulative crush strength
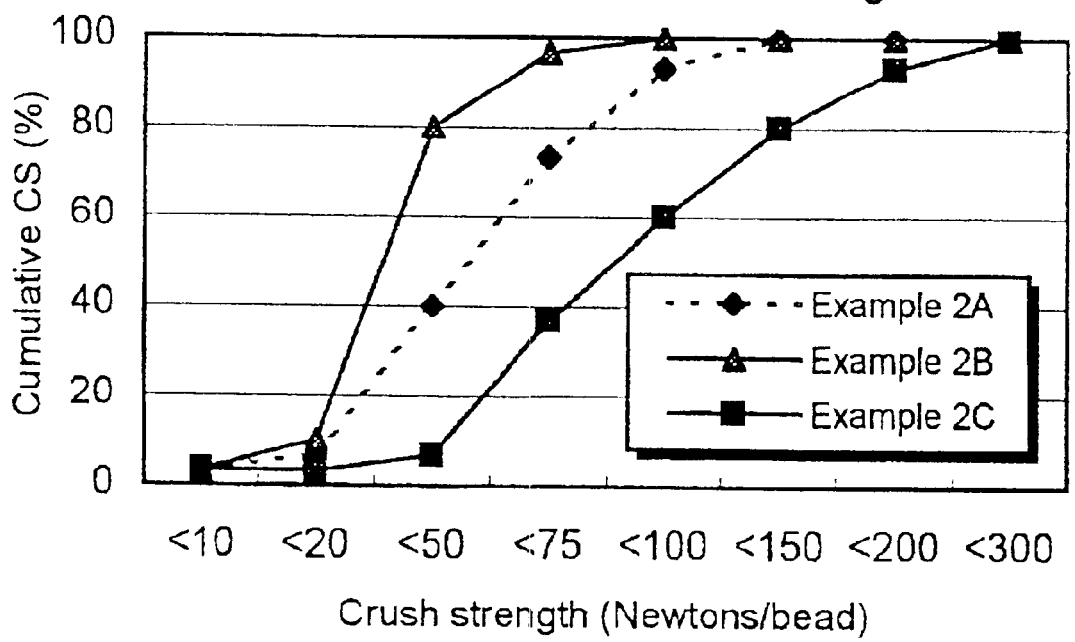
Figure 2 Cumulative crush strength

METHOD FOR MAKING SILICA SUPPORTED, CRUSH-RESISTANT CATALYSTS

FIELD OF THE INVENTION

The present invention pertains to making silica supported catalysts, particularly such catalysts with good mechanical strength.

BACKGROUND OF THE INVENTION

Silica gels and other silica components are widely used as catalyst supports in industry. For fixed bed type processes, silica-supported catalysts in a formed shape, such as beads or extrudates, are required. Two approaches have been commonly used to produce formed silica-supported catalyst particles. One involves the impregnation of catalyst components on preformed silica particles, and the other involves the preparation of silica-supported catalyst powders and then processing the powders into formed catalyst particles.

The formation of silica gel beads is a common practice in industry and well documented in open literature. Although silica gel beads with good mechanical strength can be obtained, these beads are (in general) susceptable to cracking when they are immersed in water. This precludes the use of direct aqueous impregnation on silica xerogel beads as a way to produce silica-supported catalyst beads.

To alleviate this cracking/breakage problem of silica gel beads, two types of methods have been developed. One uses organic solvents rather than water as the impregnation medium. The much lower surface tension of organic solvents significantly reduces the cracking and breakage of silica gel beads. However, the use of organic solvents increases not only the cost of manufacturing but also the complexity of the process. Another type of method aims to improve the mechanical strength of silica gel beads by calcining the beads at high temperatures (800–1000° C.), prior to catalyst impregnation. Calcining silica gels at high temperatures, however, increases the manufacturing cost and changes the surface chemistry of the silica gel, particularly causing the sintering of silica gel and the reduction of surface hydroxyl concentration. This may be very undesirable because hydroxyl groups may be the anchoring sites for many catalytic components. In both types of methods, two drying steps, one for the drying of silica gel beads and the other for the drying of catalyst beads, are necessary.

In many processes, more than one drying step is contemplated. Drying processes are typically costly. Therefore, it would be desirable to develop a process for making high strength catalysts which minimizes the number of drying steps required.

SUMMARY OF THE INVENTION

In view of its purposes, the present invention provides a method for making a catalyst which involves first forming a silica component. The method includes next washing the silica component to form a washed silica component. The washed silica component is then contacted with an aqueous, alkaline bath comprising a catalytic metal to impregnate the silica component with the catalytic metal, thereby forming an activated silica component. Then, the activated silica component is dried to form the catalyst. The present invention also provides the product produced by this method.

It is to be understood that both the foregoing general description and the following detailed description are exemplary, but not restrictive, of the invention.

BRIEF DESCRIPTION OF THE DRAWING

The invention is best understood from the following detailed description when read in connection with the accompanying drawing, in which:

FIG. 1 is a graphical depiction of the cumulative crush strengths of a catalyst sample prepared according to the present invention, as described below in Example 1; and FIG. 2 is a graphical depiction of the cumulative crush strengths of catalyst samples prepared according to the present invention, as described below in Example 2.

DETAILED DESCRIPTION OF THE INVENTION

The present invention is directed to a method of making a catalyst, particularly a silica supported catalyst. Such catalysts are useful for catalyzing the aldol condensation of propionic acid or propionic ester to methacrylic acid. Other uses of catalysts of the present invention include olefin polymerization, dehydration, hydroxylation, and isomerization. The catalysts of the present invention can be used as catalysts in a fixed bed reactor or in other reaction environments.

In general, four steps (and optional hydrothermal treatment and calcining steps) are involved in preparing the catalysts of the present invention and are carried out in the following order:
1. forming a silica component;
2. (optional) exposing the silica component to a hydrothermal treatment;
3. washing the silica component;
4. contacting the silica component with an aqueous, alkaline bath comprising a catalytic metal to impregnate the silica component with the catalytic metal to form an activated silica component;
5. drying the activated silica component; and
6. (optional) calcining the catalyst.

Step 1 above, forming a silica component, is well known the art. The silica component according to the present invention can be any compound having silica ($SiO_2$) and used as a support for catalysts, such as silica gels, co-gels, and precipitated silica, among others. Such silica components can be made by art-accepted processes using methods of preparation and purification known in the prior art. For example, the silica supports used in connection with the present invention can be prepared by the methods described in U.S. Pat. No. 4,422,959 to Lawson et al., U.S. Pat. No. 3,972,833 to Michalko et al., or U.S. Pat. No. 5,625,013 to Mueller et al. or Canadian Patent No. 1,064,008 to van Beem et al., each of which is incorporated by reference herein. As described in more detail below, methods similar to those described in U.S. Pat. No. 6,248,911, entitled PROCESS AND COMPOSITION FOR REFINING OILS USING METAL-SUBSTITUTED SILICA XEROGELS, incorporated herein by reference, may be used to prepare the silica components (which are referred to as "hydrosol beads" in that patent), except that no metal substitution step is needed in this invention.

More specifically, a silica gel may be formed by simultaneously and instantaneously mixing aqueous solutions of a mineral acid, such as sulfuric acid, and an alkali metal silicate, such as sodium or potassium silicate. The concentrations and flow rates or proportions may be adjusted so that the hydrosol contains about 8 to 14% $SiO_2$ and so that the majority of the alkali metal present in the silicate solution is neutralized. The silicate/acid mixture is then forced through a conventional nozzle in a known way. From the nozzle, the mixture forms hydrosol beads, which are allowed to set quickly to form a hydrogel (a "silica component" as used herein), all in a known manner. The beads may be caught in water or, more preferably, an aqueous ammonium sulfate solution (such as a 3% ammonium sulfate solution), which also improves the bead strength.

In one embodiment in which cesium is used as the catalytic metal and the catalyst is used in the production of ethylenically unsaturated acids or esters, in the form of beads, the hydrosol contains about 12% $SiO_2$, has a pH above about 8, and gels in a matter of 20 to 1,000 milliseconds. This results in a silicate solution which is only partially neutralized by the mineral acid, in which case the reactants are formed into spheres by spraying in air. As is well known, a partially neutralized hydrogel (i.e., on the alkaline side), has a relatively short gel time and will form a sphere in air. On the other hand, a fully neutralized hydrogel or acidic hydrogel (i.e., on the acid side), must typically be directed to an oil column to achieve its spherical shape.

As mentioned above, the silica component may be a co-gel. In this event, the step of forming the co-gel involves combining an alkali metal silicate, a mineral acid, and a source of a second metal to form a hydrosol and allowing said hydrosol to set. In one embodiment, the mineral acid may be first mixed with the source of the second metal to form a mixture, which is then combined with the alkali metal silicate. Alternatively, the second metal source may be intermixed with the mineral acid and alkali metal silicate solution via a separate stream.

The second metal may, under some conditions, serve to stabilize the catalyst in operation and also might serve to improve the catalytic activity. Such metals include zirconium, titanium, aluminum, iron, etc. The selection of these and other metals is well known to those skilled in the art and depends on the desired end use of the catalyst, among other factors. For example, titanium is known to perform well as part of an oxidation catalyst and aluminum is known to perform well as part of an alkylation catalyst. The particular amount of second metal can be identified by one skilled in the art, recognizing that too little amount of the second metal will not have any stabilizing influence while too much second metal could adversely affect the catalyst's selectivity. A typical range of the second metal might be between about 0.05 to 1.5 weight percent of the second metal, although this range will vary based on a number of factors.

In one embodiment, such as is disclosed in WO 99/52628, incorporated herein by reference, the stabilizing metal is zirconium and the source of zirconium is zirconium orthosulfate. Other sources of zirconium include zirconium nitrate, zirconium sulfate, zirconyl chloride, and zirconyl bromide, among others. Methods for preparing silica-zirconia co-gels are well-known in the art and some such methods are described in U.S. Pat. No. 5,069,816, incorporated herein by reference.

In sum, the silica components of this invention may be silica gel beads (or silica gel beads doped with other metals) and may be formed by partially neutralized sodium silicate with sulfuric acid (or acid doped with other metals, usually in the form of metal sulfates or orthosulfates). More specifically, silica hydrosols are formed by simultaneously and instantaneously mixing sodium silicate and acid, and are then forced through a nozzle. From the nozzle, the mixture forms hydrosol droplets, which are allowed to set quickly to form hydrogel beads. The size of the beads is not critical and can vary over a wide range. In some applications, the bead size may vary from less that 1 mm to 6 mm, more typically between 1 mm and 4 mm, the size range for most fixed bed operations.

An optional step, exposing the silica component to a hydrothermal treatment, may be carried out if it is desired to increase the pore diameter which allows the reactants to reach internal surfaces of the catalyst. This step also has the effect of decreasing the surface area of the silica component. In general, this step involves heating the silica component in an alkaline hydrothermal solution. More specifically, exposing the silica gel to elevated temperatures at alkaline pH leads to a rearrangement of the gel structure; surface area is reduced and the mean pore diameter of the final product is increased. This process is known in the art as "hydrothermal treatment." An acid-set gel needs to be adjusted to alkaline or neutral pH for this to occur, but an alkaline-set gel needs only be held at an elevated temperature for some period of time. All of these effects are well-known to those skilled in the art and are described in many publications and patents. In particular, it is believed that smaller hydrogel particles dissolve and larger particles get still larger during hydrothermal treatment, causing the specific surface area of a sample to decrease.

Whether to undergo hydrothermal treatment and, if so, the extent to which this is done, depends largely on the desired end use of the catalyst. Hydrothermal treatment is especially desired when the pore diameter of the silica component is too small to allow reactants of the desired end use to reach internal surfaces of the silica component, or the products of the desired end use to diffuse out of the silica pores. Typical hydrothermal treatment conditions might include a temperature of between 40 C and 100 C (or higher if pressurized), a pH of between about 7–11, and a time of between 4 and 40 hours. The hydrothermal solution may be rendered alkaline by using a base, such as sodium hydroxide or ammonium hydroxide. This step is also referred to in the art as "aging" or "steeping," although steeping typically refers to treatment at neutral pH which necessitates a longer steep time to achieve the same effect. More specifically, as reaction time, temperature and pH are increased, the surface area of the silica gel particles will decrease further and the pore diameter will increase to a greater extent.

The silica component is then washed using one of two different methods. In the first method (Method 1), the silica component is acidified and then washed with acidified water. For example, the beads may be acidified by exposure to sulfuric acid, such as to a pH of between about 1.5 to 2.5, and more preferably to about 2. The acidified water used may have a pH adjusted to between about 2.5 to 4, and more preferably between about 3–3.5, typically by use of sulfuric acid. In the second washing method (Method 2), the silica component is washed with aqueous ammoniun sulfate solution and then neutral water. In this washing method an ammonium cation displaces a sodium cation as follows: $Si—ONa^+ + NH_4^+ \leftrightarrows Si—ONH_4^+ + Na^+$. The water wash displaces a significant amount of the ammonium cations, and the subsequent impregnation of cesium (or another catalytic metal) displaces almost all of the remaining ammonium as the catalytic metal is preferentially bonded to the silica component. In this invention, these washed hydrogel beads are the feedstock for catalyst bead preparation.

Neither of the two washing methods set forth herein seem to be particularly preferred and other known washing methods may be employed. It has been found that the second washing method tends to decrease the pore volume of the silica gel to a greater extent. On the other hand, the presence of calcium or magnesium cations in city water adsorbs onto the silica gel when using the (second) washing method while these cations do not tend to do so when using the (first) wash method. Regardless of the particular washing method used, multiple washing stages may be employed as is well-known in the art, until the sodium concentration in the effluent is at or below an acceptable level, preferably at or close to zero. This can be determined by atomic absorption or, more easily, by ion conductivity. The washing may occur as a batch process, by concurrent flow, or by countercurrent flow.

The washed silica component is then contacted with an aqueous, alkaline bath containing a catalytic metal. The conditions of this step, such as the contact time and temperature, are chosen to allow for impregnation of the silica component with the catalytic metal to form an activated silica component. Preferably, the conditions are selected so that the reaction between metal and silica surface hydroxyl groups reaches or nearly reaches equilibrium. In most cases, a certain metal loading is targeted, for example, targeting 6% Cs on a gel with a surface area of 300 m$^2$/g, which corresponds to about 21% hydroxyl coverage. The specific conditions will vary depending on a number of factors, such as the type of the silica component, the hydroxyl concentration of the silica component, and the specific catalytic metal used and its form. Therefore, contact times and temperatures can vary over a wide range, such as between about 1 to 8 hours and from room temperature to heated up to 60° C. and higher. As mentioned in the examples below, a contact time of 4 hours is often sufficient. The concentration of the aqueous, alkaline bath may also vary over a wide range, keeping in mind the solubility limit of the catalytic metal. For example, the concentration of metal may range from 0.02 to 0.2 M. Slight agitation to encourage impregnation, but not too strong so as to cause some of the spheres to break, is preferably employed.

It has been found that the bath should have an alkaline pH to improve the strength, or crush resistance, of the silica gel catalysts. More preferably, the pH of the aqueous bath, as measured at the end of impregnation, should be between about 7.5 and 10, and even more preferably between about 8 and 9.5. A base, such as ammonia in the form of ammonium hydroxide, may be used to render the bath alkaline. The amount of ammonium hydroxide may vary over a wide range, and could be between 0.015 to 0.05 grams ammonium hydroxide per gram silica component. Ammonia is particularly desirable because the protons released during the ion exchange reaction Si—OH+Cs$^+$⇌Si—OCs+H$^+$ can be neutralized by ammonia, driving this reaction to the right. Moreover, ammonia evolves easily during drying or calcining, leaving no residual impurity in the catalyst, in contrast to other bases such as NaOH or KOH. It is believed that a portion of the cesium is bonded to the silica component by ion exchange while another portion of the cesium is retained in the pores of the silica component.

The bath may include a salt of the catalytic metal, water, and ammonium hydroxide, and the catalytic metal may be alkali and/or alkaline earth metals, as well as other metals. In cases where cesium is used as the catalytic metal, it is mixed with water and ammonium hydroxide in the form of cesium carbonate, cesium nitrate, cesium acetate, cesium chloride, etc. In cases where the metal forms insoluble metal hydroxide, for example Mg(OH)$_2$ and Ca(OH)$_2$, ammonium hydroxide must be added in a carefully controlled way during the impregnation to prevent the formation of insoluble metal hydroxide. After this step, the silica component is deemed "activated" in that an active catalytic component is impregnated thereon.

Then, the activated silica component is dried, such as in a drying unit or oven. The silica component can be dried to anywhere from between about 0.01% to 25% moisture content. Typically, the catalyst will be dried to <5% moisture. Either in the same unit or in a separate unit, the dried silica component may then be calcined. Whether to calcine or not depends largely on the end use of the catalyst, with many of the same considerations of whether to undergo hydrothermal treatment relevant. The details of calcination are well known to those skilled in the art. The calcination conditions can be determined empirically and depend on a number of factors, including the composition of the silica gel, the intended use of the catalyst, etc.

The catalysts may be used in fixed bed applications, in which case the catalysts may be used in their spherical form as made. The catalysts may also be ground and used as powders or reformed into granules, pellets, aggregates, or extrudates. The form of the catalysts is primarily dictated by the desired end use of the catalysts and the conditions during that end use.

The specific porosimetric properties of the silica component do not appear to be critical with respect to the present invention. These properties include pore volume, pore diameter, and surface area of the silica component. These values will likely be dictated, to some extent, by the end use of the catalysts. It is believed that, in many cases, the higher the surface area of the catalyst, the more active the catalyst. Thus, a surface area of at least 50 m$^2$/g is desirable in many cases. As mentioned above, it is desirable that the pore diameter of the silica component be above a certain threshold value so that the reactants of the desired end use can reach the internal surfaces of the catalyst.

As demonstrated by the examples below, the silica gel bead supported catalysts of the present invention show good mechanical strength and crush resistance. Moreover, with the use of only one drying step in the fabrication process, an economical process for making catalysts is presented.

EXAMPLES

The following examples are included to more clearly demonstrate the overall nature of the invention. These examples are exemplary, not restrictive, of the invention.

In the examples, crush strength is determined in the manner as set forth in the following: A sample was separated into two portions: good beads (no breakage and no visible cracks) and bad beads (broken particles and beads with visible cracks). 30 beads, all about 4 mm in diameter, were randomly picked for the portion of "good beads" and their crush strength measured using a Chatillon TCM201 crush tester. Results are reported in two fashions: the average crush strength and the cumulative crush strength. The average crush strength is the median crush strength of the subject sample. The weight percent of cesium is the weight of cesium divided by the total weight of the catalyst.

Example 1

A silica hydrosol component (namely, a silica-zirconia co-gel hydrosol) containing 12% of SiO$_2$ was prepared by rapidly mixing solutions of zirconia-containing sulfuric acid and sodium silicate. The acid solution had a concentration of 10.7%H$_2$SO$_4$ and a temperature of about 85° F. In addition, the sulfuric acid was first mixed with zirconium orthosulfate to achieve a concentration of 0.20 wt % Zr. The silicate solution had a nominal SiO$_2$:Na$_2$O weight ratio of 3.2, a solids level of 30.5% and a temperature of about 85° F. The flow rates of the acid and silicate solutions were adjusted such that 90% of the sodium in the silicate was neutralized; the pH was above about 8. The hydrosol was sprayed into the air and allowed to form into spheres and the beads were then caught in a 3% ammonium sulfate aqueous solution. The gel time was less than one second.

The spheres were then hydrothermally treated at about 90° C. The spheres were then washed by first acidifying them with sulfuric acid to a pH of about 2 and washing them with water acidified with sulfuric acid to a pH of between about 3 and 3.5. The washing was continued until the sodium concentration of the effluent was nearly zero. The washed silica co-gel beads had a surface area of 318 m$^2$/g, a moisture content of 84.5% LOD, and 0.8 wt. % zirconium, on a dry weight basis. A portion of these beads were dried at 120° C. in air (Example 1A). Another portion of the beads were soaked in an aqueous solution of $Cs_2CO_3$ and ammonia (condition: 645 g hydrogel:10.8 g $Cs_2CO_3$:455 g $H_2O$:3 g conc. NH3) for 4 hours, decanted and then dried at 120° C. in air (Example 1B). Table 1 and FIG. 1 compare these two samples.

TABLE 1

| Sample | Example 1A | Example 1B | Example 1C |
|---|---|---|---|
| SA, m$^2$/g | 318 | 250 | 257 |
| PV, cc/g | 1.10 | 0.91 | 0.99 |
| Cs, % | 0 | 6.3 | 6.5 |
| % broken beads | 31 | 13 | 76 |
| Avg. crush strength, Newtons/bead | 37 | 102 | 76 |

It is clear from Table 1 and FIG. 1 that not only the percentage of good beads is increased, but also the strength of the beads is much improved for the catalyst beads prepared by hydrogel impregnation, compared to that of the support beads. Based on prior art processes, it is not expected that the manner in which the catalytic metal is added would have such a significant and positive impact on the strength of the beads. For comparison, another sample Example 1C) was prepared from sample Example 1A by conventional solvent impregnation on xerogel beads under the following conditions: 100 xerogel:10 g $Cs_2CO_3$:250 cc alcohol. Results are also listed in Table 1. Although alcohol has much lower surface tension than water, the breakage of beads is still severe. Only 24% of the resulted catalyst gels were good beads; the 76% of broken beads broke into mostly half beads.

Example 2

In another example of this invention, a silica-zirconia co-gel was made in a similar way as in Example 1 (0.8% Zr and 72.9% LOD). A portion of these beads were washed using the same wash method of Example 1 and then dried at 120° C. in air (Example 2A). Another portion of beads is washed using Method 2. This portion of beads are then further splited into two fractions. One fraction of beads is dried at 120° C. in air (Example 2B), and the other fraction soaked in aqueous solution of $Cs_2CO_3$ and ammonia (condition: 369 g hydrogel:11.5 g $Cs_2CO_3$:731 g $H_2O$:3 g conc. $NH_3$) for 4 hours, decanted and then dried at 120° C. in air (Example 2C). The silica beads contained 0.8 wt percent zirconium on dry basis and had a surface area of about 300 m$^2$/g. Table 2 and FIG. 2 compare these three samples.

TABLE 2

| Sample | Example 2A | Example 2B | Example 2C | Example 2D |
|---|---|---|---|---|
| SA, m$^2$/g | 307 | 302 | 258 | 262 |
| PV, cc/g | 1.26 | 1.07 | 0.98 | 1.02 |
| Cs, % | 0 | 0 | 5.64 | 6.3 |
| % broken beads | 36 | 15 | 12 | 100 |
| Avg. crush strength, Newtons/bead | 43 | 56 | 103 | NA |

It is again clear from Table 2 and FIG. 2 that the strength of catalyst beads is much improved compared to those of the support beads, regardless of the washing methods used. For comparison, a catalyst sample (Example 2D) was prepared by aqueous impregnation of a sample of xerogel beads prepared in accordance with Example 2A. When this sample of beads was immersed into an aqueous solution of $Cs_2CO_3$, all beads shattered into pieces. This again demonstrates that the catalyst prepared in accordance with the method of the present invention is far superior than prior art methods.

Although illustrated and described herein with reference to certain specific embodiments and examples, the present invention is nevertheless not intended to be limited to the details shown. Rather, various modifications may be made in the details within the scope and range of equivalents of the claims and without departing from the spirit of the invention.

What is claimed:

1. A method for making a catalyst comprising the steps of:
   forming a silica component, wherein the silica component is a silica hydrogel;
   washing said silica hydrogel;
   contacting said silica hydrogel with an aqueous, alkaline bath comprising a catalytic metal selected from the group consisting of an alkali metal and an alkaline earth metal to impregnate said silica hydrogel with said catalytic metal to form an activated silica hydrogel; and
   drying said activated silica hydrogel to form said catalyst.

2. The method in accordance with claim 1, wherein said alkaline bath has a pH of between about 7.5 and 10 at the end of the metal impregnation.

3. The method in accordance with claim 2, wherein said alkaline bath has a pH of between about 8 and 9.5 at the end of the metal impregnation.

4. The method in accordance with claim 1, wherein said alkaline bath further comprises a salt of said catalytic metal and ammonium hydroxide.

5. The method in accordance with claim 4, wherein said catalytic metal is cesium and said salt is cesium carbonate.

6. The method in accordance with claim 1, wherein the step of forming said silica hydrogel comprises mixing an alkali metal silicate with a mineral acid to form a hydrosol and allowing said hydrosol to set.

7. The method in accordance with claim 1, wherein said silica hydrogel comprises a co-gel and the step of forming said co-gel comprises combining an alkali metal silicate, a mineral acid, and a source of a second metal to form a hydrosol and allowing said hydrosol to set.

8. The method in accordance with claim 7, wherein the combining step comprises first mixing said mineral acid with said source of said second metal to form a mixture then combining said alkali metal silicate with said mixture.

9. The method in accordance with claim 7, wherein said second metal is selected from the group consisting of zirconium, titanium, aluminum and Fe.

10. The method in accordance with claim 9, wherein said second metal is zirconium and said source of zirconium is zirconium orthosulfate.

11. The method in accordance with claim 1, wherein the washing step comprises acidifying said silica hydrogel and then washing said acidified silica hydrogel with acidified water.

12. The method in accordance with claim 11, wherein the pH of said acidified silica hydrogel is about 1.5 to 2.5, and th pH of said acidified water is about 2.5 to 4.

13. The method in accordance with claim 1, wherein the washing step comprises washing said silica hydrogel with an aqueous ammonium sulfate solution then with neutral water.

14. The method in accordance with claim 1 further comprising, prior to the washing step, heating said silica hydrogel in an alkaline hydrothermal solution.

15. The method in accordance with claim 1 further comprising calcining said dried catalyst.

16. The method in accordance with claim 1, wherein said alkaline bath further comprises ammonium hydroxide.

17. The method in accordance with claim 1, wherein said catalytic metal is an alkali metal.

18. A method for making a catalyst comprising the steps of:

combining an alkali metal silicate, a mineral acid, and a source of zirconium to form a hydrosol and allowing said hydrosol to set to form a co-gel;

washing said co-gel;

contacting said co-gel with an aqueous, alkaline bath comprising cesium to impregnate said co-gel with said cesium to form an activated silica co-gel, wherein said bath has a pH between and 8 and 9.5 at the end of the metal impregnation; and drying said activated silica co-gel to form said catalyst.

* * * * *